United States Patent
Michihata et al.

[11] Patent Number: 6,055,096
[45] Date of Patent: Apr. 25, 2000

[54] PROTECTIVE FILM OF POLARIZING PLATE AND POLARIZING PLATE

[75] Inventors: Isamu Michihata; Koichi Nagayasu; Toru Kobayashi; Chie Kanbe, all of Hino, Japan

[73] Assignee: Konica Corporation, Tokyo, Japan

[21] Appl. No.: 08/758,552

[22] Filed: Nov. 29, 1996

[30] Foreign Application Priority Data

Dec. 15, 1995 [JP] Japan ...................................... 7-327156

[51] Int. Cl.$^7$ ...................................................... G02B 5/30
[52] U.S. Cl. ........................... 359/352; 359/350; 359/361; 359/483; 359/500
[58] Field of Search .................................... 359/361, 485, 359/483, 500, 350, 352; 349/96; 252/589

[56] References Cited

U.S. PATENT DOCUMENTS

| | | | |
|---|---|---|---|
| 4,387,133 | 6/1983 | Ichikawa et al. | 359/483 |
| 4,427,741 | 1/1984 | Aizawa et al. | 359/483 |
| 5,516,456 | 5/1996 | Shinohara et al. | 252/299.01 |
| 5,746,857 | 5/1998 | Murata et al. | 156/102 |
| 5,753,140 | 5/1998 | Shigemura | 252/299.01 |
| 5,770,316 | 6/1998 | Starzewski | 359/490 |
| 5,805,336 | 9/1998 | Dalzell et al. | 359/493 |
| 5,806,834 | 9/1998 | Yoshida | 252/589 |

*Primary Examiner*—Cassandra Spyrou
*Assistant Examiner*—John Juba, Jr.
*Attorney, Agent, or Firm*—Frishauf, Holtz, Goodman, Langer & Chick, P.C.

[57] ABSTRACT

A protective film of a polarizing plate is disclosed which is made of a resin film containing a UV absorbent and has a change in linear dimensions of −0.06 to 0.06%.

24 Claims, No Drawings

PROTECTIVE FILM OF POLARIZING PLATE AND POLARIZING PLATE

FIELD OF THE INVENTION

The present invention relates to a protective film of a polarizing plate and a polarizing plate employing the same, and particularly to a protective film of a polarizing plate and a polarizing plate employing the same excellent in durability.

BACKGROUND OF THE INVENTION

The polarizing plate, in which a cellulose triacetate (hereinafter referred to as TAC) film as a protective film is laminated on a dyed uniaxially stretched polyvinyl alcohol (hereinafter referred to as PVA) polarizing film, is widely used, for example, in a displaying panel of a liquid crystal displaying device of an electric calculator, a personal computer or a word processor. A polarizing film of a polarizing plate employing a polycarbonate (hereinafter referred to as PC) film has been proposed to obtain higher durability as disclosed in Japanese Patent O.P.I. Publication No. 57-30808/1982. Further, a polarizing plate having excellent water resistance and heat resistance is expected employing a PC film which has excellent dimensional stability and a low water absorption property.

Recently, a polarizing plate for a liquid crystal displaying has been used under severe conditions as in a displaying panel of a liquid crystal displaying device for cars or of a large liquid crystal TV. The polarizing plate employing a transparent resin film only having excellent dimensional stability is not sufficient to obtain a desired durability. The present inventors have made an extensive study and found that the polarizing plate of the invention shows excellent durability in ultraviolet ray resistance and dimensional stability and further shows improved blocking propensity.

SUMMARY OF THE INVENTION

A first object of the invention is to provide a polarizing plate having excellent durability in that delamination is reduced between a polarizing film and a protective film in the polarizing plate, and to provide a protective film for preparing the polarizing plate.

A second object of the invention is to provide a polarizing plate having excellent durability in that lowering of polarization degree is reduced, and to provide a protective film for preparing the polarizing plate.

A third object of the invention is to provide a polarizing plate having excellent blocking propensity, and to provide a protective film for preparing the polarizing plate.

DETAILED DESCRIPTION OF THE INVENTION

The above objects of the invention can be attained by the followings:

(1) a protective film of a polarizing plate, the protective film made of a resin film containing a UV absorbent, wherein the protective film has a change in linear dimensions of −0.06 to 0.06%, (2) the protective film of (1) above, wherein the resin film is transparent, (3) the protective film of a polarizing plate, the protective film made of a polycarbonate resin film containing a UV absorbent, (4) the protective film of (1) above, wherein the resin film is a polycarbonate resin, (5) the protective film of (1), (2) or (3) above, wherein the protective film has a retardation of 30 nm or less, (6) a protective film of a polarizing plate, the protective film made of a resin film containing a UV absorbent having a change in linear dimensions of −0.06 to 0.06%, wherein the protective film has a change in linear dimensions of −0.06 to 0.06% and has a retardation of 30 nm or less, or (7) a polarizing plate comprising a polarizing film and the protective film of a polarizing plate of (1), (2), (3), (4), (5) or (6) above.

The polarizing plate protective film itself, which is provided on a polarizing film to protect the polarizing film, must be stable. In the invention, further stability of the polarizing film has been intended by employing, for the protective film, a resin film having excellent dimensional stability and a low water absorption rate. The polarizing film containing iodine is unstable and is likely to be affected by outside influence, occasionally resulting in great lowering of polarization degree. In the invention, a UV absorbent is applied to a resin film, preferably transparent, for a protective film, whereby a lowering of the polarization degree can be markedly minimized without an influence of UV light on the polarizing film.

The present inventors have made an extensive study and found that although even a transparent resin film having excellent dimensional stability is not satisfactory for a protective film for a polarizing film, the protective film according to the invention containing a UV absorbent has improved dimensional stability besides the above effects. Even though the degree of improvement is small, it is extremely effective in that the resin film, in which high durability is required as a protective film of a polarizing plate, is further improved. Still further, the protective film containing a UV absorbent has been proved to be excellent in blocking propensity.

The protective film of a polarizing plate has a retardation of preferably 30 nm or less, whereby double refraction is minimized and the polarizing plate is sufficiently effected. Thus, although the protective film according to the invention containing a UV absorbent is a small improvement of dimensional stability, it contributes much to capability enhancement of the polarizing plate.

The polarizing plate employing the protective film of the invention has excellent durability.

The present invention will be detailed below.

The protective film of the invention has a thickness of preferably 20 to 150 μm, and more preferably 30 to 100 μm.

The protective film of the invention is preferably made of a transparent resin film containing a UV absorbent and has a change in linear dimensions of −0.06 to 0.06%.

The transparent resin film herein referred to means a film having a transmittance of 70% or more at a wavelength of 500 nm when the film is measured by a spectrophotometer U-3000 produced by Hitachi Seisakusho Co., Ltd.

Change in linear dimensions herein referred to is obtained by the following:

Two points on the protective film are marked with a "+" and the resulting film is heat treated at 90° C. for 60 hours and then allowed to stand at 23° C. for 24 hours. Thereafter, the distance between the two points before and after the heat treatment is measured at 23° C. and 55% RH according to a factory microscope. Change in linear dimensions is given by the following formula:

(the distance after the heat treatment−the distance before the heat treatment)×100/ the distance before the heat treatment The typical resin film example used for preparing the protective film having the change in linear dimensions described above includes a polycarbonate film, a polyarylate film, a norbornene resin film, a syndiotactic polystyrene film and a polysulfone film. Of these, a polycarbonate film, a polyarylate film or a norbornene resin film is preferable, and a polycarbonate film is especially preferable, in view of the effects of the invention.

A film having a retardation of 30 nm or less can be easily prepared from a polycarbonate resin, and the polycarbonate resin is suitable for a protective film of a polarizing plate having high capability. The polycarbonate resin, which contains a UV absorbent, is effected particularly as a protective film of a polarizing plate.

In the invention, as a protective film of a polarizing plate a polycarbonate film containing a UV absorbent is especially preferably employed. There are various resins for manufacturing the polycarbonate film, and an aromatic polycarbonate is preferable, and a bisphenol A polycarbonate is especially preferable.

The bisphenol A for a polarizing plate is preferably a bisphenol A derivative in which a benzene ring, a cyclohexane ring or an aliphatic hydrocarbon group is incorporated in the bisphenol A molecule, and is more preferably a bisphenol A derivative having reduced anisotropy in which a central carbon atom in the bisphenol A molecule has different groups asymmetrically. For example, a polycarbonate comprising a asymmetrical bisphenol A is preferable in which a methyl group in the bisphenol A molecule is substituted with a phenyl group or hydrogen of the benzene ring in the bisphenol A molecule is substituted with a methyl group or a phenyl group.

Such a polycarbonate is obtained employing 4,4'-dihydroxydiphenyl alkane or a halogenated compound thereof according to a phosgene method or an ester exchange reaction method. The 4,4'-dihydroxydiphenyl alkane includes 4,4'-dihydroxydiphenyl methane or 4,4'-dihydroxydiphenyl ethane or 4,4,'-dihydroxydiphenyl butane.

The protective film in the invention comprising a polycarbonate may be a film in which the polycarbonate film is laminated on at least one side of a polystyrene film, a polymethyl methacrylate film or a cellulose acetate film. The manufacturing method of the polycarbonate film used in the invention is not limited and a conventional method such as an extrusion method, a solution casting method or a calendering method may be used. In the invention, a uniaxially or diaxially stretched film may be used, but a solvent casting film is preferably used in view of excellent surface property, isotropy or a reduced anisotropy.

The polycarbonate used in the invention has a glass transition temperature (Tg) of preferably not less than 110° C. and more preferably not less than 120° C.

The resin for the polyarylate film preferably used in the invention is, for example, preferably a polycondensate obtained from bisphenol A and phthalic acid. The typical example is U polymer produced by Unitika Co., Ltd.

The resin for preparing the norbornene resin film preferably used in the invention is a polymer comprising a norbornene monomer unit, and preferably a polyolefin having a norbornene structure. The typical example of the norbornene resin is APO produced by Mitsui Sekiyukagaku Co., Ltd., Zeonex produced by Nihon Zeon Co., Ltd. or ARTON produced by Nihon Goseigomu Co., Ltd.

The resin for preparing the polysulfone resin film preferably used in the invention includes polysulfone, polyether sulfone and polyarylsulfone, and the typical example thereof is poly(oxy-1,4-phenylene-1,4-phenylene) or poly(oxy-1,4-phenyleneisopropylidene-1,4-phenyleneoxy-1,4-phenylenesulfonyl-1,4-phenylene).

The resin for preparing the syndiotactic polystyrene resin film preferably used in the invention is a polystyrene resin having a stereo regularity, a syndiotactic structure, in which phenyl groups or substituted phenyl groups as a side chain are alternatively positioned on opposite sides to the polystyrene main chain. Generally, the film comprises polystyrene having mainly recemo chains in the polystyrene structure or a composition containing the polystyrene. This polystyrene, if a homopolymer, can be synthesized by polymerization disclosed in Japanese Patent O.P.I. Publication No. 62-117708/1987, and another styrene copolymer can be synthesized by polymerization disclosed in Japanese Patent O.P.I. Publication No. 1-178505/1989.

The present invention relates to a protective film of a polarizing plate, and in order to give high capability to the polarizing plate, the protective film used preferably has a small retardation. The polarizing plate according to the invention, which comprises a protective film having a retardation of 30 nm or less, can give a high capability.

The retardation in the invention will be explained below.

When light is irradiated to the transparent resin film in the invention, the light transmitted through the film is divided into two rays wherein the vibration directions are perpendicular to each other. The two rays have different refractive indexes, and as the rays proceed in the film, the difference between the proceeding distances is produced. That is, the two rays are different in velocity proceeding. Retardation means the difference between the proceeding distances of the two rays emerging from the resin film and is represented in terms of nm. In the invention, retardation is measured at 23° C. and 55% RH with an automatic double refractometer, KOBRA-21DH (produced by AS Systems Co., Ltd.).

The protective resin film in the invention preferably has a retardation of 30 nm or less, and when such a film is used in a displaying panel for a liquid crystal, it provides a high contrast image and a clear liquid crystal image. Herein, a retardation of 30 nm or less gives a high contrast image, and a retardation of 20 nm or less is more preferable and can provide a polarizing plate with high performance.

The protective film having a retardation as described above, is manufactured by a conventional method such as an extrusion method or a solution casting method or a calendering method in the invention comprising The manufacturing method of the polycarbonate film used in the invention is not limited and a conventional method such as a melt-extrusion method, a solution casting method or a calendering method. In the invention, the solvent casting film is preferably used in view of excellent surface property, isotropy or a reduced anisotropy.

The UV absorbent in the invention is preferably a UV absorbent which has excellent absorption of ultraviolet light having a wavelength of 370 nm or less to minimize capability deterioration of a liquid crystal and has reduced absorption of visible light having a wavelength of 400 nm or more in clearly displaying a liquid crystal image. The UV absorbent includes an oxybenzophenone compound, a benzotriazole compound, a salicylic acid ester compound, a benzophenone compound, a cyanoacrylate compound and a nickel complex compound, but is not limited thereto.

The protective film of the invention may contain one or more of the UV absorbents or different two or more of the UV absorbents.

The UV absorbent preferably used in the invention includes a benzotriazole type UV absorbent and a benzophenone type UV absorbent. A polycarbonate resin film containing benzophenone type UV absorbent, which is less colored, is especially preferable in that performance of the polarizing plate is more marked and the invention is effected.

The benzotriazole type UV absorbent is preferably a compound represented by the following formula (1): formula (1)

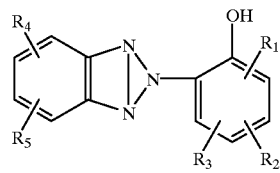

wherein $R_1$, $R_2$, $R_3$, $R_4$ and $R_5$ may be the same or different, and independently represent a hydrogen atom, a halogen atom, a nitro group, a hydroxyl group, an alkyl group, an alkenyl group, an aryl group, an alkoxy group, an aryloxy group, an acyloxy group, an alkylthio group, an arylthio group, a mono- or di-alkylamino group, an acylamino group or a 5- or 6 -membered heterocyclic ring, provided that $R_4$ and $R_5$ may combine with each other to form a hydrocarbon ring.

In formula (1), $R_1$, $R_2$, $R_3$, $R_4$ and $R_5$ may be the same or different, and independently represent a hydrogen atom, a halogen atom (chlorine, bromine, iodine, fluorine), a nitro group, a hydroxyl group, an alkyl group (for example, methyl, ethyl, n-propyl, isopropyl, aminopropyl, n-butyl, sec-butyl, tert-butyl, chlorobutyl, n-amyl, iso-amyl, hexyl, octyl, nonyl, stearylamidobutyl, decyl, dodecyl, pentadecyl, hexadecyl, cyclohexyl, benzyl, phenylethyl, phenylpropyl), an alkenyl group(for example, vinyl, allyl, methallyl, dodecenyl, tridecenyl, tetradecenyl, octadecenyl), an aryl group (for example, phenyl, 4-methylphenyl, 4-ethoxylphenyl, 2-hexoxylphenyl, 3-hexoxylphenyl), an alkoxy group (for example, methoxy, ethoxy, propoxy, butoxy, chlorobutoxy, decoxy, pentadecoxy, octadecoxy), an acyloxy group (for example, carbomethoxy, carbobutoxy, carbohexoxy, carbopentadecoxy), an aryloxy group (for example, phenoxy, 4-methylphenoxy, 2-propylphenoxy, 3-amylphenoxy), an alkylthio group (for example, methylthio, ethylthio, n-propyl, tert-butylthio, octylthio, benzylthio), an arylthio group (for example, phenylthio, methylphenylthio, ethylphenylthio, methoxylphenylthio, ethoxylphenylthio, naphthylthio), a mono- or di-alkylamino group (for example, N-ethylamino, N-t-octylamino, N,N-diethylamino, N,N-di-t-butylamino), an acylamino group (for example, acetylamino, benzoylamino, methanesulfonylamino), or a 5- or 6-membered heterocyclic ring containing an oxygen or nitrogen atom (for example, piperidino, morpholino, pyrrolidino, piperazino), provided that $R_4$ and $R_5$ may combine with each other to form a hydrocarbon ring.

The examples of a compound represented by formula (1) is listed below, but are not limited thereto.
(1-1) 2-(2'-hydroxy-5'-t-butylphenyl)-benzotriazole
(1-2) 2-(2'-hydroxy-3',5'-di-t-butylphenyl)-benzotriazole
(1-3) 2-(2'-hydroxy-3'-t-butyl-5'-methylphenyl)-5-chlorobenzotriazole
(1-4) 2-(2'-hydroxy-3',5'-di-t-butylphenyl)-5-chlorobenzotriazole
(1-5) 2-(2'-hydroxy-5'-isooctylphenyl)-benzotriazole
(1-6) 2-(2'-hydroxy-5'-n-octylphenyl)-benzotriazole
(1-7) 2-(2'-hydroxy-3',5'-t-amylphenyl)-benzotriazole
(1-8) 2-(2'-hydroxy-5'-dodecylphenyl)-benzotriazole
(1-9) 2-(2'-hydroxy-5'-hexadecylphenyl)-benzotriazole
(1-10) 2-(2'-hydroxy-3'-t-amyl-5'-benzophenyl)-benzotriazole Besides the above compounds, Compounds (IV-1) through (IV-39) disclosed on page 10 to 12 of Japanese Patent O.P.I. Publication No. 60-128434/1985 may be used.

The above benzotriazole compounds can be easily synthesized according to a synthetic method disclosed in Japanese Patent Publication No. 44-29620/1969.

The benzophenone type UV absorbent, one of UV absorbent preferably used in the invention, is preferably a compound represented by the following formula (2): formula (2)

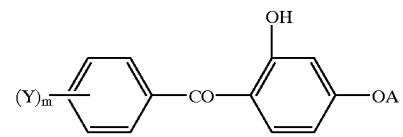

wherein Y represents a hydrogen atom, a halogen atom or an alkyl, alkenyl or phenyl group, each of which may have a substituent; A represents a hydrogen atom, an alkyl group, an alkenyl group or a phenyl group, a cycloalkyl group, an alkylsulfonyl group or —CO(NH)$_{n-1}$—D in which D represents an alkyl group or an alkenyl group or a substituted or unsubstituted phenyl group and n is 1 or 2; and m represents an 1 or 2.

In the above, the alkyl group includes a straight-chained or branched alkyl group having 1 to 24 carbon atoms, the alkoxy group includes an alkoxy group having 1 to 18 carbon atoms, the alkenyl group includes an alkenyl group having 2 to 16 carbon atoms, for example, an allyl group or a 2-butenyl group. The substituent of the alkyl, alkenyl or phenyl group includes a halogen atom, for example, a chlorine, bromine or fluorine atom, a hydroxy group, a carboxyl group, an alkylcarbonyl group, an alkoxycarbonyl group, an alkylsulfonyl group or a phenyl group which may further have an alkyl group or a halogen atom as a substituent.

The examples of a compound represented by formula (2) are listed below, but are not limited thereto.

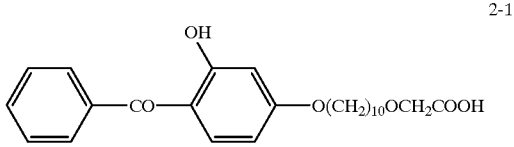

2-1

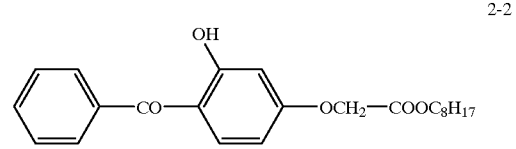

2-2

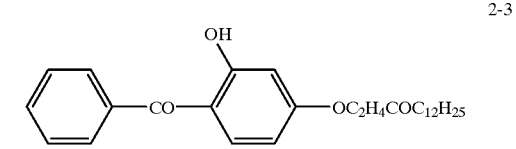

2-3

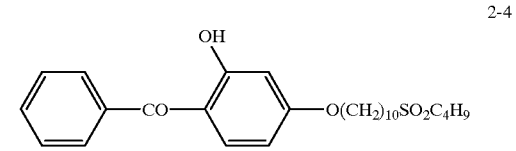

2-4

-continued

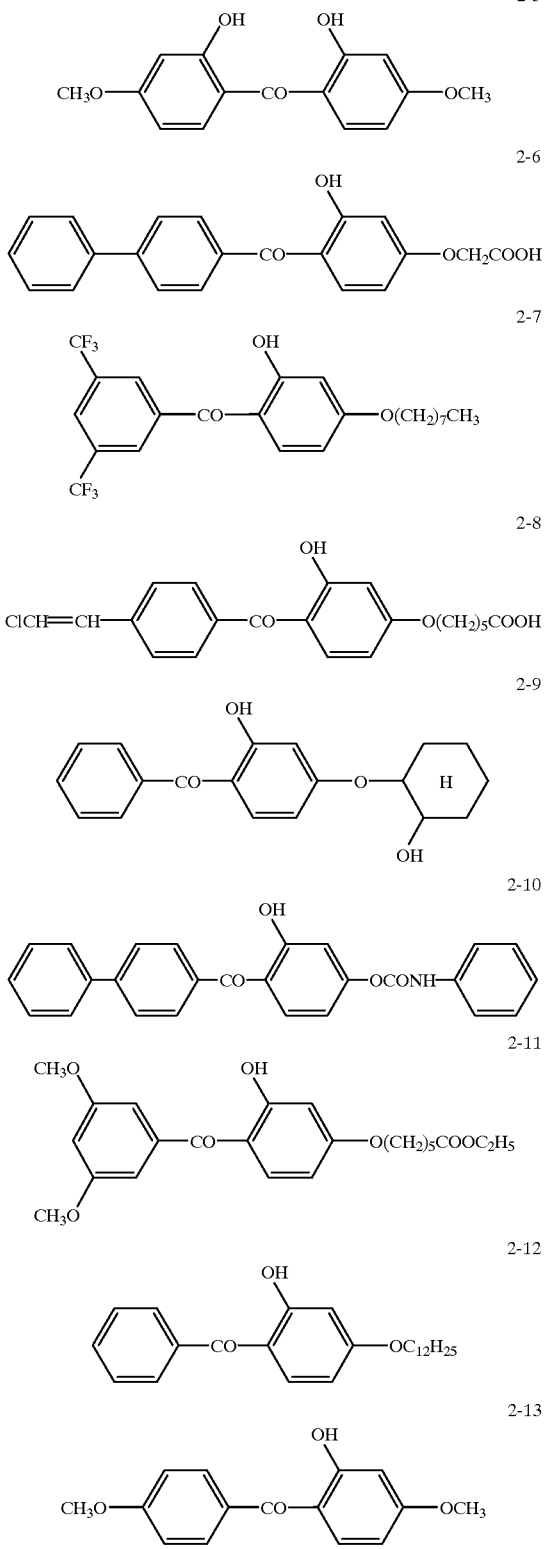

The UV absorbent content of the protective film of the invention is preferably 0.2 to 3 g, and more preferably 0.5 to 2 g per m² of protective film, although it depends on kinds of UV absorbent or usage conditions.

The UV absorbent may be added to the dope composition for the protective film of the invention directly or in the form of an organic solvent (methanol or ethylene dichloride) solution containing the absorbent.

The epoxy compound, a weak organic acid or a saturated polyhydric alcohol as a degradation preventing agent for a resin or a hindered phenol, a thioether or a phosphorous acid ester as an anti-oxidizing agent for an organic acid may be used in combination with the benzotriazole or benzophenone type UV absorbent preferably used in the invention.

The method for manufacturing the protective film of the invention is not limited, and may be a conventional one well known in the art. The method is disclosed in, for example, U.S. Pat. Nos. 2,492,978, 2,739,070, 2,739,069, 2,492,977, 2,336,310, 2,367,603, 2,492,978 and 2,607,704, British Patent Nos. 64071 and 735892, and Japanese Patent Nos. 45-9074/1970, 49-4554/1974, 49-5614/1974, 60-27562/1985, 61-39890/1986 and 62-4208/1987.

In the protective film of the invention, the transparent resin film containing a UV absorbent is used. The preferable method for manufacturing the film of the invention will be detailed below.

The solvent of the transparent resin in the invention includes benzene, toluene, xylene, dioxane, acetone, methylethyl ketone, methyl acetate, ethyl acetate, trichloroethylene, methylene chloride, ethylene chloride, tetrachloroethane, trichloroethane, chloroform, methanol, ethanol, n-propylalcohol, iso-propylalcohol, and n-butanol.

The preferable is a mixture of methylene chloride in an amount of 70 to 95 weight % and another solvent in an amount of 5 to 30 weight %. The transparent resin concentration of the solution is preferably 10 to 50 weight %. The temperature dissolving the resin in a solvent is near a boiling point of the solvent, for example, 60° C. or more, preferably 80° C. to 110° C. The pressure is set not to evaporate the solvent at an operation temperature.

The solution in a vessel in which the resin is dissolved is removed from the vessel while cooling, or is removed form the vessel through a pump and cooled through a heat exchanger. The removed solution is subjected to film making.

The method for manufacturing the polycarbonate film preferably used in the invention will be described below.

Generally, the solution containing a polycarbonate and a UV absorbent is spread on a stainless steel band, dried and separated from the stainless steel band. The drying time or temperature is adjusted to give a film having an intended retardation.

The polarizing film, which is a main component of the polarizing plate of the invention, is a film transmitting only a light having a wave front of a specific direction. The typical polarizing film is a polyvinyl alcohol polarizing film which is dyed with iodine or two color type dye. The film is manufactured by making a film from an aqueous polyvinyl alcohol solution, uniaxially stretching the film and dyeing the stretched film or dyeing the film and then uniaxially stretching the dyed film. The resulting film is preferably treated with a boron compound for its durability. The polarizing plate of the invention is formed by adhering the surface of a polarizing film to the transparent plastic film, the protective film of the invention.

The polarizing plate of the invention includes a plate in which the protective film of a polarizing plate is adhered to a polarizing film. An adhesive is used to adhere the protective film to the polarizing film. The adhesive includes a polyvinyl alcohol adhesive such as polyvinyl alcohol or polyvinyl butyral, and a vinyl latex adhesive such as butyl acrylate.

EXAMPLE

The invention will be detailed according to the following examples, but is not limited thereto.

Preparation of Sample 1
The following dope composition A was prepared

Dope composition A

| | |
|---|---|
| Polycarbonate resin (bisphenol A type, a viscosity average molecular weight 40,000) | 1000 parts by weight |
| Exemplified compound 1-2 | 1.0 part by weight |
| Methylene chloride | 430 parts by weight |
| Methanol | 90 parts by weight |

The above composition was incorporated and tightly closed in a vessel and stirred at 80° C. while pressure was applied to obtain a solution. Thus, dope composition A was prepared.

The dope composition A was filtered, cooled, spread at 33° C. on a stainless steel band, dried at 33° C. for 5 minutes, and further dried at 65° C. to give a retardation of 5 nm. The resulting film was separated from the stainless steel band, and dried while transporting on many rollers to obtain a 80 μm thick polycarbonate resin film. Thus, sample 1 was obtained.

<Preparation of Samples 2 and 3>

The dope compositions B and C were prepared in the same manner as in the dope composition A, except that Exemplified compound 1-2 was added in an amount shown in Table 1. Samples 2 and 3 were prepared in the same manner as in Sample 1, except that the dope compositions B and C were used instead of the dope composition A.

<Preparation of Sample 4>

The dope composition A was filtered, cooled, spread at 33° C. on a stainless steel band, dried at 33° C. for 10 minutes. The resulting film was separated from the stainless steel band, dried while transporting on many rollers, and heated at 150° C. to give a retardation of 28 nm. Thus, a 80 μm thick polycarbonate film was obtained. Sample 4 was prepared in the same manner as in sample 1, except that this film was used.

<Preparation of Sample 5>

In a polymerization reaction vessel were placed 1.1 kg of a polycarbonate having an unsaturated group in its polymer chain end, 4.9 kg of styrene and 1.0 g of n-dodecylmercaptan, and the vessel was charged with nitrogen. The mixture was elevated to 120° C., and polymerization reaction was carried out adding a mixture solution of 1.9 kg of styrene, 6.5 kg of methacrylic acid and 5.1 g of n-dodecylmercaptan while stirring. The resulting reaction mixture was mixed with isopropanol to produce precipitate. Thus, white powdered resin was obtained. This resin had a content ratio of 1:1 by weight of the polycarbonate component and the polystyrene component, and had a weight average molecular weight of 100,000 in terms of polystyrene. This resin is designated as polycarbonate/polystyrene graft polymer a.

The following dope composition D was prepared.

Dope composition D

| | |
|---|---|
| Polycarbonate resin (bisphenol A type, a viscosity average molecular weight 40,000) | 42 parts by weight |
| Polycarbonate resin (bisphenol A type, a viscosity average molecular weight 5,000) | 5 parts by weight |

-continued

Dope composition D

| | |
|---|---|
| Styrene-maleic anhydride copolymer (Dilak 232, produced by MTC-ARCO Co., Ltd.) | 43 parts by weight |
| Polycarbonate/polystyrene graft polymer a | 10 parts by weight |
| Exemplified compound 1-2 | 1.0 part by weight |
| Methylene chloride | 430 parts by weight |
| Methanol | 90 parts by weight |

The above composition was incorporated and tightly closed in a vessel and stirred at 80° C. while pressure was applied to obtain a solution. Thus, dope composition D was prepared.

The dope composition D was filtered, cooled, spread at 33° C. on a stainless steel band, dried at 33° C. to give a retardation of 20 nm. The resulting film was separated from the stainless steel band, and dried while transporting on many rollers to obtain a 80 μm thick resin film.

<Preparation of Samples 6, 8, 9, 10 and 12>

The dope compositions E, G, H, I and K were prepared in the same manner as in the dope composition A, except that UV absorbents shown in Table 1 were added in an amount shown in Table 1 instead of Exemplified compound 1-2. Samples 6, 8, 9, 10 and 12 were prepared in the same manner as in Sample 1, except that the dope compositions E, G, H, I and K were used instead of the dope composition A, respectively.

<Preparation of Sample 7>

The dope composition F was prepared in the same manner as in the dope composition A, except that 0.5 parts by weight of Exemplified compound 1-2 and 0.5 parts by weight of Exemplified compound 1-4 were added instead of 1.0 part by weight of Exemplified compound 1-2. Sample 7 was prepared in the same manner as in Sample 1, except that the dope composition F were used instead of the dope composition A.

<Preparation of Sample 11>

The dope composition J was prepared in the same manner as in the dope composition A, except that 2.0 parts by weight of Exemplified compound 1-1 and 2.0 parts by weight of Exemplified compound 1-3 were added instead of 1.0 part by weight of Exemplified compound 1-2. Sample 11 was prepared in the same manner as in Sample 1, except that the dope composition J were used instead of the dope composition A.

<Preparation of Sample 13>

In a 1000 ml reaction vessel charged with nitrogen 1.5 g of $Pd(CH_3CN)_4(BF_4)_2$ was dissolved in a 100 ml nitromethane. The solution, in which 150 g of 8-carboxyltetracyclo-$[4.4.0.1^{2.5}.1^{7.10}]$-3-dodecene was dissolved in a 150 ml nitromethane was added thereto at room temperature while stirring and reacted for one hour. Methanol of 500 ml was added to the reaction mixture and filtered to obtain precipitate. The resulting precipitate was washed with a mixture solution of 300 ml of methanol and 40 ml of concentrated hydrochloric acid, further washed with methanol, and dried at 60° C. at vacuum pressure to obtain a norbornene type resin.

The following dope composition L was prepared.

| Dope composition L | |
|---|---|
| Norbornene type resin | 1000 parts by weight |
| Exemplified compound 1-2 | 1.0 part by weight |
| Methylene chloride | 430 parts by weight |
| Methanol | 90 parts by weight |

The above composition was incorporated and tightly closed in a vessel and stirred at 80° C. while pressure was applied to obtain a solution. Thus, dope composition L was prepared.

The dope composition L was filtered, cooled, spread at 33° C. on a stainless steel band, dried at 33° C. for 5 minutes, and further dried at 65° C. to give a retardation of 5nm. The resulting film was separated from the stainless steel band, and dried while transporting on many rollers to a 80 μm thick norbornene type resin film. Thus, sample 13 was obtained.

<Preparation of Sample 14>

The following dope composition M was prepared.

| Dope composition M | |
|---|---|
| Polycarbonate resin (bisphenol A type, a viscosity average molecular weight 40,000) | 1000 parts by weight |
| Methylene chloride | 430 parts by weight |
| Methanol | 90 parts by weight |

Sample 14 was prepared in the same manner as in Example 1, except that the dope composition M was used instead of the dope composition A. The change in linear dimensions of the polycarbonate resin film was 0.01%.

<Preparation of Sample 15>

The dope composition N was prepared in the same manner as in the dope composition L, except that Exemplified compound 1-2 was not added. Sample 15 was prepared in the same manner as in Sample 13, except that the dope composition N was used instead of the dope composition L. The change in linear dimensions of the resin film used was 0.02%.

<Preparation of Sample 16>

The dope composition O was prepared in the same manner as in the dope composition D, except that Exemplified compound 1-2 was not added. Sample 16 was prepared in the same manner as in Sample 5, except that the dope composition O was used instead of the dope composition D. The change in linear dimensions of the resin film used was 0.03%.

<Evaluation of Samples 1 through 16>

Samples 1 through 16 were evaluated for polarization degree change, compatibility, change in linear dimensions and blocking propensity. The evaluation methods were as follows:

<Measurement of polarization degree change and its evaluation>

The polarizing plates were prepared employing samples 1 through 16 as follows:

On one side of each of samples 1 through 16 were coated 20 ml of each of the following lower layer solution (1) and upper layer solution (2) in that order and dried for 10 minutes at 100° C. Thus, protective films having an adhesive layer were obtained.

| Lower layer solution (1) | | |
|---|---|---|
| Polymer compound a | 0.5 | g |
| Acetone | 60 | ml |
| Ethyl acetate | 30 | ml |
| Toluene | 10 | ml |
| Upper layer solution (1) | | |
| Polyvinyl alcohol (Completely saponified) | 0.5 | g |
| Saponin (produced by Merc Co., Ltd.) | 0.03 | g |
| Pure water | 50 | ml |
| Methanol | 50 | ml |

Polymer Compound a

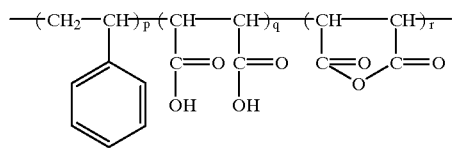

(p:q:r = 50:25:25)

A 120 μm thick polyvinyl alcohol film was immersed in an aqueous solution containing 1 part by weight of iodine and 4 parts by weight of boric acid, and stretched by a factor of 4 at 50° C. to obtain a polarizing film. Then, both surfaces of the polarizing film were coated with an aqueous 5% completely saponified polyvinyl alcohol solution. Thereafter, each of the protective films obtained above was adhered to the both surfaces of the polarizing film, so that the adhesive layer of the protective film contacts the surfaces. Thus, polarizing plates 1 through 16 were obtained.

The parallel transmittance and perpendicular transmittance of each of the thus obtained polarizing plates 1 through 16 were measured and the polarization degree was calculated according to the following equation (a). After each sample was subjected to light exposure of 70,000 lux for 500 hours at 60° C. (accelerated aging), the parallel transmittance and perpendicular transmittance were measured and polarization degree was calculated according to the following equation (a). The polarization degree change was calculated according to the following equation (b). The polarization degree change (%) of samples 1 through 4 and samples 6 through 12 was compared with that of sample 14, the polarization degree change (%) of sample 13 was compared with that of sample 15, and the polarization degree change (%) of sample 5 was compared with that of sample 16. The results are shown in Table 1.

$$\text{Polarization degree} = ((H_0 - H_{90})/(H_0 + H_{90}))^{1/2} \times 100 \quad (a)$$

$$\text{Polarization degree change} = P_0 - P_{500} \quad (b)$$

wherein $H_0$ represents a parallel transmittance, $H_{90}$ represents a perpendicular transmittance, $P_0$ represents a polarization degree before accelerated aging and $P_{500}$ represents a polarization degree after accelerated aging.

<Evaluation of compatibility>

The dope compositions A' through L' were prepared in the same manner as in the dope compositions A through L, respectively, except that a double amount of the UV absorbent was added. Samples 1' through 13' were prepared in the same manner as in Samples 1 through 13, respectively, except that the dope compositions A' through L' were used instead of the dope compositions A through L. Each of the resulting samples was allowed to stand at 80° C. and 90%

RH for 500 hours. The UV absorbent oozing from each sample was visually observed, and evaluated according to the following three ranks:

○: No oozing (this can be put into practical use)

Δ: Partial and slight oozing (this can also be put into practical use)

Regarding the blocking propensity, samples 1 through 4 and samples 6 through 12 were compared with sample 14, sample 13 was compared with sample 15, and sample 5 was compared with sample 16. The results are shown in Table 1.

TABLE 1

| Sample No. | Dope composition | UV absorbent Exemplified compound | Content (parts by weight) | Polarization degree change (%) | Compatibility | Change in linear dimensions (%) | Blocking (%) | Remarks |
|---|---|---|---|---|---|---|---|---|
| 1 | A | 1-2 | 0.1 | 0.13 | ○ | 75 | 60 | Inv. |
| 2 | B | 1-2 | 0.2 | 1.80 | ○ | 89 | 88 | Inv. |
| 3 | C | 1-2 | 4.0 | 0.08 | ○ | 68 | 51 | Inv. |
| 4 | A | 1-2 | 1.0 | 0.14 | ○ | 78 | 62 | Inv. |
| 5 | D | 1-2 | 1.0 | 0.16 | ○ | 78 | 63 | Inv. |
| 6 | E | 1-4 | 1.0 | 0.23 | ○ | 77 | 61 | Inv. |
| 7 | F | 1-2 + 1-4 | 1.0 | 0.20 | ○ | 75 | 61 | Inv. |
| 8 | G | 1-1 | 1.0 | 0.41 | ○ | 74 | 63 | Inv. |
| 9 | H | 1-1 | 4.0 | 0.15 | Δ | 70 | 52 | Inv. |
| 10 | I | 1-3 | 4.0 | 0.27 | Δ | 71 | 58 | Inv. |
| 11 | J | 1-1 + 1-3 | 4.0 | 0.21 | Δ | 70 | 51 | Inv. |
| 12 | K | 2-5 | 1.0 | 4.81 | ○ | 75 | 62 | Inv. |
| 13 | L | 1-2 | 1.0 | 0.14 | ○ | 77 | 64 | Inv. |
| 14 | M | None | — | 100 | — | 100 | 100 | Comp. |
| 15 | N | None | — | 100 | — | 100 | 100 | Comp. |
| 16 | O | None | — | 100 | — | 100 | 100 | Comp. |

X: Entire oozing (this can not be put into practical use)

The results are shown in Table 1.

<Measurement of change in linear dimensions and its evaluation>

Two points on each of samples 1 through 16 were marked with a "+", and the resulting film was heat treated at 90° C. for 60 hours and then allowed to stand at 23° C. for 24 hours. Thereafter, the distance between the two points before and after the heat treatment is measured at 23° C. and 55%RH according to a measure microscope. Thus, change in linear dimensions was obtained. The change in linear dimensions of samples 1 through 4 and samples 6 through 12 were compared with that of sample 14 defined as being 100. Similarly, sample 13 was compared with sample 15, and sample 5 was compared with sample 16. The results are shown in Table 1.

<Measurement of blocking propensity and its evaluation>

Each of samples 1 through 16 was measured according to the following procedures:

The sample of 35 mm (width)×950 mm (length) was wound six turns around a core having a diameter of 50 mm applying a load of 1 kg. A two-sided adhesive tape of 30 mm (width)×5 mm (length) was adhered to the trailing edge of the sample to hold the film steady. The core was removed. The resulting roll of film was stored at 23° C. and 55% RH for 24 hours, and put on an electric balance with the periphery contacted. Then, the film was pressed at a rate of 10 mm per one minute from the above upper periphery and the stress was measured. Next, the stress was measured for one-turned roll film.

Blocking propensity of the samples was evaluated by subtracting 6 times the stress of the one-turned rolled film from that of the six-turned rolled film.

As is apparent from Table 1, the polarizing plate of the invention, which employs a transparent resin film containing a UV absorbent, shows markedly reduced polarization degree charge and change in linear dimensions and greatly improved blocking propensity.

The higher the UV absorbent content is, the more greatly improved the polarization degree change, change in linear dimensions and blocking propensity.

The polarizing plate employing a transparent resin film having less retardation shows more improved polarization degree change, change in linear dimensions and blocking propensity.

The polarizing plate employing a benzotriazole UV absorbent is more superior in polarization degree change and blocking propensity to the polarizing plate employing a benzophenone UV absorbent.

What is claimed is:

1. A protective film of a polarizing plate, the protective film comprising a resin film consisting of one layer containing an ultraviolet (UV) absorbent, wherein the resin film has a change in linear dimensions of −0.06 to 0.06%, and the protective film has a retardation of no more than 30 nm, the chance in linear dimensions being obtained by the following:

two points are marked on the resin film; thereafter the resin film is heat treated to 90° C. for 60 hours and then allowed to stand at 23° C. for 24 hours; the distance between the two points before and after the heat treatment is measured at 23° C. and 55% RH; the chance in linear dimensions is calculated by the following formula:

(the distance after the heat treatment)−(the distance before the heat treatment)×100/(the distance before the heat treatment).

2. The protective film of claim 1, wherein the resin film is transparent.

3. The protective film of claim 1, wherein the protective film has a thickness of 20 to 150 μm.

4. The protective film of claim 1, wherein the resin film contains the UV absorbent in an amount of 0.2 to 3 g per m² of the film.

5. The protective film of claim 1, wherein the resin film is selected from the group consisting of a polycarbonate film, a polyarylate film, a polynorbornene film, a syndiotactic polystyrene film and a polysulfone film.

6. The protective film of claim 5, wherein the resin film is a polycarbonate film.

7. The protective film of claim 1, wherein the UV absorbent is a benzotriazole compound or a benzophenone compound.

8. The protective film of claim 7, wherein the UV absorbent is a benzotriazole compound.

9. The protective film of claim 7, wherein the benzotriazole compound is represented by the following formula (1):

formula (1)

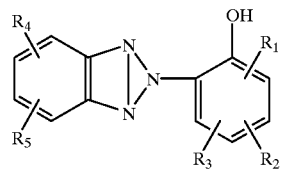

wherein $R_1$, $R_2$, $R_3$, $R_4$ and $R_5$ are independently selected from the group consisting of a hydrogen atom, a halogen atom, a nitro group, a hydroxyl group, an alkyl group, an alkenyl group, an aryl group, an alkoxy group, an aryloxy group, an acyloxy group, an alkylthio group, an arylthio group, a mono- or di-alkylamino group, an acylamino group and a 5- or 6-membered heterocyclic ring, provided that $R_4$ and $R_5$ may combine with each other to form a hydrocarbon ring.

10. The protective film of claim 7, wherein the benzophenone compound is represented by the following formula (2):

formula (2)

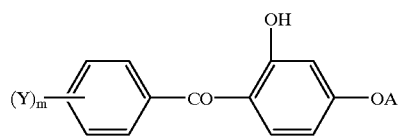

wherein Y is selected from the group consisting of a hydrogen atom, a halogen atom, a substituted or unsubstituted alkyl group, a substituted or unsubstituted alkenyl group and a substituted or unsubstituted phenyl group; A is selected from the group consisting of a hydrogen atom, an alkyl group, an alkenyl group or a phenyl group, a cycloalkyl group, an alkylsulfonyl group and —CO(NH)$_{n-1}$—D in which D is selected from the group consisting of an alkyl group, an alkenyl group and a substituted or unsubstituted phenyl group and n is 1 or 2; and m is 1 or 2.

11. The protective film of claim 1, having a retardation value of no more than 20 nm.

12. The protective film of claim 1, wherein the protective film has a change in linear dimensions of –0.06 to 0.06%.

13. A polarizing plate comprising a polarizing film with two surfaces and provided thereon, two protective films comprising a resin film consisting of one layer containing an ultraviolet (UV) absorbent, wherein each of the resin film has a change in linear dimensions of –0.06 to 0.06% and the protective film has a retardation of no more than 30 nm and wherein one of the protective films is adhered to a first of said two surfaces of the polarizing film and the other protective film is adhered to a second of said two surfaces of the polarizing film, the chance in linear dimensions being obtained by the following:

two points are marked on the resin film; thereafter the resin film is heat treated to 90° C. for 60 hours and then allowed to stand at 23° C. for 24 hours; the distance between the two points before and after the heat treatment is measured at 23° C. and 55% RH; the chance in linear dimensions is calculated by the following formula:

(the distance after the heat treatment)–(the distance before the heat treatment)×100/(the distance before the heat treatment).

14. The polarizing plate of claim 13, wherein each resin film is transparent.

15. The polarizing plate of claim 13, wherein each protective film has a thickness of 20 to 150 µm.

16. The polarizing plate of claim 13, wherein each resin film contains a UV absorbent in an amount of 0.2 to 3 g per m² of the film.

17. The polarizing plate of claim 13, wherein each resin film is a film selected from the group consisting of a polycarbonate film, a polyarylate film, a polynorbornene film, a syndiotactic polystyrene film and a polysulfone film.

18. The polarizing plate of claim 13, wherein each resin film is a polycarbonate film.

19. The polarizing plate of claim 13, wherein the UV absorbent is a compound selected from the group consisting of a benzotriazole compound and a benzophenone compound.

20. The polarizing plate of claim 19, wherein the UV absorbent is a benzotriazole compound.

21. The polarizing plate of claim 19, wherein the benzotriazole compound is represented by the following formula (1): formula (1)

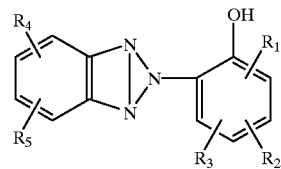

wherein $R_1$, $R_2$, $R_3$, $R_4$ and $R_5$ independently represent a member selected from the group consisting of a hydrogen atom, a halogen atom, a nitro group, a hydroxyl group, an alkyl group, an alkenyl group, an aryl group, an alkoxy group, an aryloxy group, an acyloxy group, an alkylthio group, an arylthio group, a mono- or di-alkylamino group, an acylamino group and a 5- or 6-membered heterocyclic ring; or $R_4$ and $R_5$ combine with each other to form a hydrocarbon ring.

22. The polarizing plate of claim 19, wherein the benzophenone compound is represented by the following formula (2): formula (2)

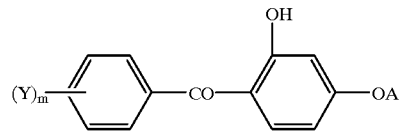

wherein Y represents a member selected from the group consisting of a hydrogen atom, a halogen atom, a substituted or unsubstituted alkyl group, a substituted or unsubstituted alkenyl group and a substituted or unsubstituted phenyl group; A represents a member selected from the group consisting of a hydrogen atom, an alkyl group, an alkenyl group, a phenyl group, a cycloalkyl group, an alkylsulfonyl group and —CO(NH)$_{n-1}$—D in which D represents a member selected from the group consisting of an alkyl group, an alkenyl group and a substituted or unsubstituted phenyl group and n is 1 or 2; and m represents 1 or 2.

23. The polarizing plate of claim 13, having a retardation value of no more than 20 nm.

24. The polarizing plate of claim 13, wherein the protective film has a change in linear dimensions of −0.06 to 0.06%.

* * * * *